US010686316B2

(12) United States Patent
Shuy et al.

(10) Patent No.: US 10,686,316 B2
(45) Date of Patent: Jun. 16, 2020

(54) CONTROLLED ENERGY STORAGE BALANCE TECHNOLOGY

(71) Applicant: LT LIGHTING (TAIWAN) CORP., Xiangshan Dist., Hsinchu (TW)

(72) Inventors: Geoffrey Wen-Tai Shuy, Taipei (TW); Wen Tien Chang, Kaohsiung (TW); Chang Horang Li, Hsinchu (TW); Zhen Hui Lee, Zhubei (TW); Zheng Zhao Guo, Taipei (TW); Wen Tsung Lo, Kaohsiung (TW)

(73) Assignee: LT LIGHTING (TAIWAN) CORP., Hsinchu (TW)

( * ) Notice: Subject to any disclaimer, the term of this patent is extended or adjusted under 35 U.S.C. 154(b) by 0 days.

(21) Appl. No.: 15/796,534

(22) Filed: Oct. 27, 2017

(65) Prior Publication Data

US 2018/0069403 A1    Mar. 8, 2018

Related U.S. Application Data

(63) Continuation-in-part of application No. 15/424,566, filed on Feb. 3, 2017, now Pat. No. 10,177,575, which
(Continued)

(51) Int. Cl.
*H02J 3/38* (2006.01)
*H02J 3/14* (2006.01)
(Continued)

(52) U.S. Cl.
CPC ............... *H02J 3/385* (2013.01); *G05F 1/67* (2013.01); *H02J 3/14* (2013.01); *H02J 7/34* (2013.01);
(Continued)

(58) Field of Classification Search
CPC .... H02J 3/385; H02J 9/061; H02J 3/14; H02J 7/34; H02S 40/38; G05F 1/67
See application file for complete search history.

(56) References Cited

U.S. PATENT DOCUMENTS 7,919,953 B2 * 4/2011 Porter ..................... G05F 5/00
323/222
2008/0285317 A1 * 11/2008 Rotzoll ................. H02M 7/493
363/80
(Continued)

OTHER PUBLICATIONS

PCT/US18/35463, Notification of Transmittal of the International Search Report and the Written Opinion of the International Searching Authority, or Declaration dated Jun. 26, 2018. (11 pages).

*Primary Examiner* — Jared Fureman
*Assistant Examiner* — Emmanuel Dominique
(74) *Attorney, Agent, or Firm* — Workman Nydegger

(57) ABSTRACT

An energy storage system that comprises an energy reservoir and a system controller. The energy reservoir is charged by DC energy from a DC energy source while discharging DC energy to a DC/AC converter. A system controller regulates the DC energy discharged from the energy reservoir to the DC/AC converter to nearly balance the amount of DC energy charged into the energy reservoir. Because this charging and discharging is nearly balanced, the size of the energy reservoir can be made quite small relative to the amount of charging and discharging. This is advantageous where the flow of charge and discharge is high, as might be the case if the energy reservoir receives charge from all or a substantial portion of a power station, such as a solar power station. With such a controller, the use of an energy reservoir becomes technically feasible even with such large current flows.

19 Claims, 9 Drawing Sheets

Related U.S. Application Data is a continuation-in-part of application No. 14/880,101, filed on Oct. 9, 2015, now abandoned.

(51) Int. Cl.
 *G05F 1/67* (2006.01)
 *H02J 7/34* (2006.01)
 *H02S 40/38* (2014.01)
 *H02J 9/06* (2006.01)

(52) U.S. Cl.
 CPC .............. *H02J 9/061* (2013.01); *H02S 40/38* (2014.12); *Y02E 10/58* (2013.01); *Y02P 90/50* (2015.11)

(56) References Cited

U.S. PATENT DOCUMENTS

| | | | | |
|---|---|---|---|---|
| 2010/0246230 A1* | 9/2010 | Porter | ..................... | G05F 5/00 363/131 |
| 2010/0289337 A1* | 11/2010 | Stauth | ..................... | H02J 3/385 307/77 |
| 2011/0133552 A1* | 6/2011 | Binder | ..................... | H02J 9/061 307/22 |
| 2011/0140648 A1* | 6/2011 | Lee | ..................... | H02J 3/32 320/101 |
| 2013/0328397 A1* | 12/2013 | Lee | ..................... | H02J 3/32 307/23 |
| 2014/0103855 A1* | 4/2014 | Wolter | ..................... | H02J 7/35 320/101 |
| 2014/0293669 A1* | 10/2014 | Fornage | ..................... | H02J 3/385 363/95 |
| 2015/0001945 A1* | 1/2015 | Estes | ..................... | H02J 9/062 307/66 |
| 2015/0229131 A1* | 8/2015 | Gerhardinger | ..................... | H02J 3/385 307/22 |
| 2015/0244306 A1* | 8/2015 | Estes | ..................... | H02S 40/38 700/287 |
| 2016/0036232 A1 | 2/2016 | Shuy | | |
| 2016/0149417 A1* | 5/2016 | Davis | ..................... | H02J 7/0021 320/162 |
| 2017/0097259 A1* | 4/2017 | Brown | ..................... | E06B 9/24 |
| 2017/0149250 A1 | 5/2017 | Shuy | | |

\* cited by examiner

CONTROLLED ENERGY STORAGE BALANCE TECHNOLOGY

CROSS-REFERENCE TO RELATED APPLICATIONS

This patent application is a continuation-in-part of U.S. patent application Ser. No. 15/424,566, filed Feb. 3, 2017, which patent application is incorporated herein by reference in its entirety. U.S. patent application Ser. No. 15/424,566 is continuation-in-part of U.S. patent application Ser. No. 14/880,101, filed Oct. 9, 2015, which patent application is incorporated herein by reference in its entirety.

BACKGROUND

Photovoltaic (PV) power stations generate electricity by converting solar energy to electricity. That generated electricity is then provided to an electric power grid. The solar energy source (i.e., the received rays of the sun) is characterized as having time varying intensity. Accordingly, PV power generators in such PV power stations incorporate a power generation optimization device (also referred to as an "optimizer"). One type of optimizer is named the "maximum power point tracker (MPPT)" (or "MPPT device"), which tracks an instantaneous maximum power production point (MPPP) voltage that the MPPT device uses to control operation of the PV power station. This practice is referred as the "blind MPPT conformation" herein. The MPPT device typically is software or firmware; and keeps track of the time varying voltage resulting in the maximum power production from the time varying solar energy source.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein are directed towards an energy storage system that comprises an energy reservoir and a system controller. The energy reservoir is charged by DC energy from a DC energy source while discharging DC energy to a DC/AC converter. A system controller regulates the DC energy discharged from the energy reservoir to the DC/AC converter to nearly balance the amount of DC energy charged into the energy reservoir. Because this charging and discharging is nearly balanced, the size of the energy reservoir can be made quite small relative to the amount of charging and discharging. This is advantageous where the flow of charge and discharge is high, as might be the case if the energy reservoir receives charge from all or a substantial portion of a power station, such as a solar power station. With such a controller, the use of an energy reservoir becomes technically feasible even with such large current flows.

The system controller comprises a detection component, a determination component, and a delivery component, the detection component is configured to measure a stored energy level in the energy reservoir. The determination component is configured to use the measured stored energy level of the energy level to evaluate whether an adjustment is to be made. The delivery component is configured to encode the instruction to perform the adjustment into a coded message when the determination component determines that the adjustment is to be made, and is also configured to deliver the coded message to the DC/AC converter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1A:
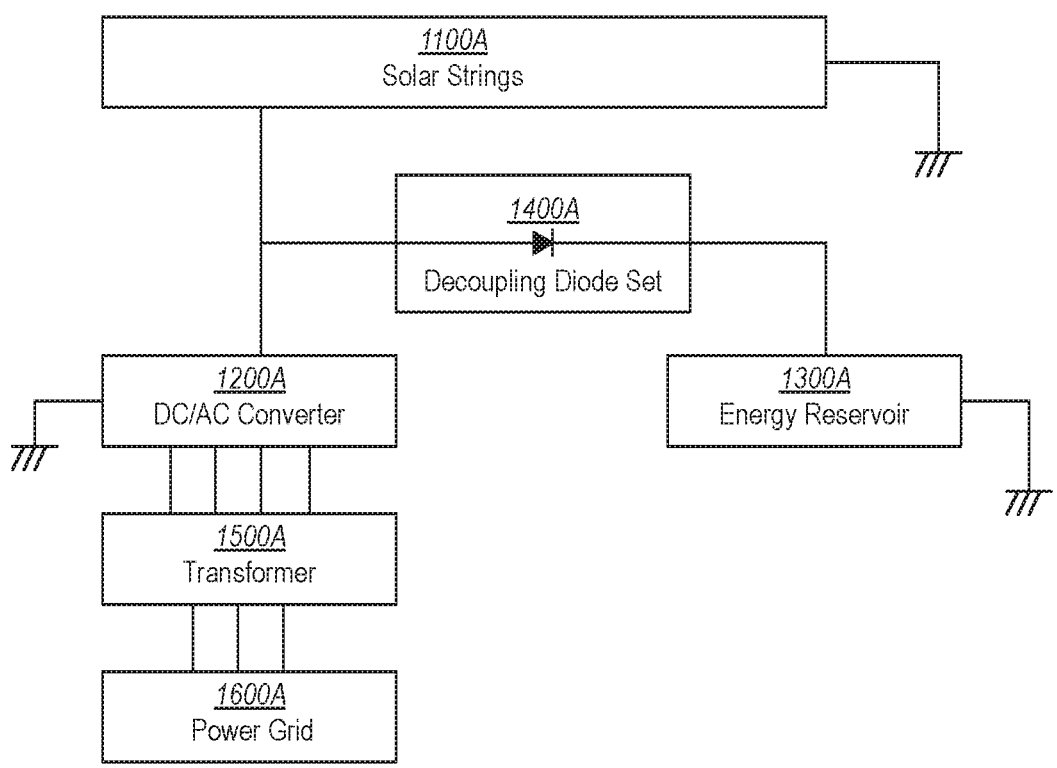
FIGS. 1A through 1C illustrate block diagrams of various power stations in which decoupling devices are used in conjunction with an energy reservoir.

Patent publications, US2016/0036232 and US2017/0149250 A1 (the contents of which are incorporated by reference herein) disclose that the PV energy systems that practice of the blind MPPT conformation achieving suboptimal amounts of electricity provided to the grid. These patent publications teach that in order to efficiently extract electricity for energy utilization, one should match the characteristics of the energy extraction device to effectively and efficiently extract the produced electric energy. Furthermore, these patent applications teach that the related devices should also be matched to condition and/or deliver the extracted electricity for efficient energy utilization.

These patent publications further emphasize the fact that the energy utilization efficiency is inextricably dependent on power demand in addition to power production. Furthermore, they teach that in any energy system, typical power consumption is not necessarily equal to power production, even when complying with the energy and charge conservation laws.

In lieu of using the MPPT device as the optimizer for solar power stations, the referenced patent publications proposed to use a "maximum energy utilization point tracker", or the "MEUPT device" as the PV power station optimizer. Such an optimizer will be referred to as an "MEUPT optimizer" herein. In according to the referred patent publications, the MEUPT optimizer is designed to capture what it refers to as "surplus energy", which it defines as the electric energy that is produced but not extracted and/or delivered to the power grid for utilization. That definition of "surplus energy" is also used herein.

The MEUPT optimizer is also designed to temporarily store the captured surplus energy within an energy reservoir; and then prepare and deliver this electric energy to the power grid for utilization. Thus, the electricity sales revenue of the PV power station can be enhanced when incorporating the MEUPT optimizer.

Section One: Functionality of the MEUPT Optimizer

In according with the principles described in the US2016/0036232 and US2017/0149250 A1 (the "referenced patent publications"), the MEUPT optimizer of one embodiment disclosed herein comprises a surplus energy extractor, an energy reservoir, and an MEUPT controller. The MEUPT controller works in concert with energy extractors and DC/AC converters. The terms "power" and "energy" (while not exactly the same) are used interchangeably in the art. Thus, unless otherwise specified, each term has the same meaning.

An energy extractor extracts an initial oscillating power train from the produced DC electric power source. The extracted initial power chain conforms to the AC power grid requirements of the power grid. In other words, the extracted initial power chain has a time varying sinusoidal voltage that having a peak voltage that conforms to power grid voltage range. Furthermore, the electrical power (which is proportional to the square of the voltage) takes the form ($\sin^2 (\omega t)$ or $\cos^2 (\omega t)$), which is synchronized (with the same phase and same frequency) with the power grid.

On the other hand, a surplus energy extractor extracts a remaining oscillating power train that remains from subtracting out the initial oscillating power train from the produced DC power. In other words, this remaining oscillating power train is a left-over oscillating power train that remains after providing the initial oscillating power train to the power grid. The remaining oscillating power train has a 90° phase shift as compared to the initial oscillating power train that was provided to the power grid. Due to the 90° phase shift, this remaining oscillating power train cannot be immediately converted into AC power for providing onto the same power grid. An energy reservoir is thus used to temporarily store the surplus energy of the remaining oscillating power train. Thereafter, the stored energy is supplied to a DC/AC converter; such that the stored surplus energy can be converted to AC power that is synchronized (with the same phase and frequency) with the same power grid.

The MEUPT controller measures the energy level of the reservoir; estimates the amount of the energy in reservoir that can be extracted; and delivers this information to the associated DC/AC converter(s) such that this energy amount can be extracted by the DC/AC converter(s). The DC/AC converter(s) then extract the stored energy from the reservoir for conversion into AC power in the form of a suitable pulsating power train and provides that AC power to the power grid. The PV power stations can thus provide almost all the produced electric energy to a power grid when incorporating the MEUPT optimizer. In contrast, without the MEUPT optimizer, the PV power station in according to the referred patent publications can only provide less than half of the produced power/energy to a power grid.

Section Two: Improve Conventional PV Power Station with MEUPT

Solar power stations are often rated in terms of some number of MegaWatts (MW). Conventionally, when a solar power station is declared to be rated at x MW (where x is some positive number), this means that the sum total of the DC power production rating of all solar strings is x MW. Such conventional solar power stations also have 3-phase DC/AC converters have a total maker declared DC/AC conversion capability that is no greater than x MW. This principle summarizes the convention power station's operations in according to the conventional MPPT practice.

In other words, the conventional PV power station of rating x MW consists of strings of x MW PV solar panels, which convert solar energy to DC electricity. The generated DC electricity is then extracted and converted by 3-phase DC/AC converters to suitable AC electric power that conforms to all the AC power requirements of a power grid, and is then provided to the power grid. This AC electrical power provided to the power grid is also referred to herein as the "initial oscillating power train". Recall that the total maker declared DC/AC conversion capability of the DC/AC converters is no greater than x MW, which is the total amount of the installed solar panels' DC generation capability declared by the solar panel industry.

In according to the description of the referenced patent publications, US2016/0036232 and US2017/0149250 A1, there exists a remaining oscillating power train that results when subtracting out the initial oscillating power train (extracted by the energy extractor) from the total DC power produced by the solar panel strings. In other words, this power train is the remaining oscillating power train which has about a 90° phase-difference from the initial oscillating power train that was extracted by the energy extractor and provided to the power grid.

Because the remaining oscillating power train is about 90° out of phase from the power grid, this remaining oscillating power train cannot be directly conditioned and converted to AC power and provided to the same power grid. In according with the principles disclosed in the referenced patent publications, an energy reservoir temporarily stores the energy containing in this 90° out of phase remaining oscillating power train (which when stored represented surplus energy). After this surplus energy is stored into the energy reservoir, the surplus energy can serve as a DC energy that can be supplied to a DC/AC converter. This surplus energy can then be converted to an AC power which conforms to all the power grid requirements (including synchronization with the power grid), such that the resulting AC power may be provided to the same grid.

Section Three: Prevent Energy Leakage from the Energy Reservoir

Before elaborating on the energy reservoir design consideration for the MEUPT optimizer, an important issue is first addressed herein. Specifically, the solar panel strings can have a very high resistance at dusk, but the solar panel string can conduct significant electric current in either direction when the sun is strong at mid-day. Therefore, the electric energy stored in the reservoir may leak through and heat the solar panels during the daytime. Accordingly, decoupling diodes may be added to each of solar panel strings such that electric energy can flow from each solar panel string to charge the reservoir, but the energy in the reservoir cannot back flow back from the reservoir into the solar panel strings. Various energy reservoir systems that accomplish this decoupling will now be described with respect to FIGS. 1A, 1B and 1C.

Section Four: Design Considerations for the Energy Reservoir

FIG. 1A depicts a block diagram that illustrates an energy reservoir 1300A that is designed to temporarily store the surplus power resulting from a power stream produced from a set of solar strings 1100A subtracting out the power drawn by a DC/AC converter 1200A when the DC/AC converter 1200A converts that power to AC power. The AC power is provided to an AC power grid 1600A through a transformer 1500A. The reservoir 1300A receives the remaining oscillating power train through a decoupling diode set 1400A. In one example, this energy reservoir 1300A is designed to temporarily store the surplus energy of a 1 MW PV power station for 2 minutes.

As an example only, assume that the primary energy source can hold at constant intensity (and that the power production of the PV strings 1100A holds so as to allow a constant 1 MW generator's power production) for 2 minutes. For the following analysis, both the initial and remaining oscillating power trains have the same repeating forms, but with a 90 degree phrase difference. Firstly, let us examine how the energy reservoir might be designed using brute force. Keep in mind that the purpose of the energy reservoir is to temporarily store surplus energy so that DC/AC converters can later convert this stored energy.

As discussed in the referenced patent publications, the estimated ratio of the surplus energy to the produced DC electric energy is over 0.5 for typical conventional PV power stations. For analyses, let us assume that the PV power station has 1 MW PV solar panel strings; and the DC power is converted to AC power to provide to a grid that is 50 hertz and line voltage 380 $V_{AC}$ 3-phase AC power. In this case, the duration time of one power cycle is equal to about 0.01 seconds and the total phase current is up to 1,000,000/(380/1.732), where 1.732 is the value of square root of 3. This ratio is the ratio of the peak voltage to line voltage (line-to-phase voltage, or "phase voltage", in 3-phase AC power). Storing the charge associate with the surplus energy in a power cycle for this power station would require an equivalent charge capacity of approximately 8 V Faradays (0.5*0.01*1,000,000/(380/1.732)), where "V" is the voltage difference of the designed reservoir before and after charging.

To maximize the energy utilization of this PV station, in some embodiments, the operating voltage of the MEUPT optimizer is to be within 75% of the PV maximum power production voltage. In other words, the voltage range of the 75% maximum power production is to be observed in those embodiments of the MEUPT optimizer. The measured I-V data indicates that typically this range is about 80 volts. When this voltage range is chosen as the charging/discharging voltage range (i.e., V=80 volts) for the energy reservoir, the charge capacity of an energy reservoir is about 0.1 Faradays per MW, per power cycle (where the power cycle lasts 0.01 second).

If the design consideration is to store this maximum amount of surplus energy accumulating over two (2) minutes, the required equivalent charge capacity is equal to 1200 Faradays (100*120*0.1) for the 1 MW PV power station. This required equivalent charge capacity is referred as the "full maximum charge capacity" and the amount of reservoir stored energy associated is referred as the "full maximum energy reservoir-capacity", or "full maximum surplus energy" herein.

If one used only thin film capacitors to fulfil this required charge capacity, the set of thin film capacitors required to achieve that charge capacity would be prohibitively large in volume and very costly in capital. Thus, it is not practical to design such an energy reservoir consisting of only thin film capacitors.

As a twist to this brute force design, one could incorporate Faraday devices (such as batteries) into the design to reduce the volume and size. The inventors' careful analyses reveals that the required charge capacitance is indeed technically manageable for an energy reservoir with thin film capacitors and Faraday devices. However, the cost of such a reservoir is still too high to be beneficial, unless the price of the battery can drop down at least by a factor of 3 while maintaining the same performance.

Using electrolytic capacitors can substantially reduce the required capital cost. However, such would increase the operating cost due to the relatively short life of such capacitors. Thus, at present, the use of electrolytic capacitors is not practical either. Therefore, the brute force way does not achieve economically beneficial designs with the required full maximum energy reservoir-capacity.

The principles described herein use the following facts observed by the inventors to resolve this issue:
(1) Most existing DC/AC converters can easily ramp power up or down 3% in one second; and also the existing 500 kW DC/AC converters can easily ramp up or down more than 10 kW in one second during operation.
(2) As a rough observation, a typical 1 MW PV power plant starts power production from zero power every morning, and rarely ramps up its power production faster than 10 kW/second in its normal daily operation.
(3) A MW-level PV power station (rated greater than 1 MW) may occasionally experience a ramping-up rate larger than 10 kW per second during a short power burst. However, the energy contained in this short burst (or even in larger 100 kW per second burst) is insignificant when compared with the total daily energy produced in MW-level power stations.

From these three facts, the inventors determined that (1) the power generation in each of the solar panel strings starts from zero every morning; and (2) the PV generator does not generate full power instantly. Thus, the remaining oscillating power train does not ramp up to its maximum value instantly. In other words, the remaining oscillating power train increases typically much more graceful than the ramp up rate of the DC/AC converters. Furthermore, the amount of energy in any short ramp-up burst is not a significant issue in energy collection for PV stations rated 1 MW or higher.

Therefore, in lieu of designing an energy reservoir capable of storing the maximum full amount of surplus energy, the principles described herein suggest to design a reservoir to store the net energy amount equal to (over say 2 minutes) the difference between the surplus energy input into the reservoir, and the energy that the DC/AC converter(s) extracted out of the reservoir. This amount of energy is referred as the "maximum differential surplus energy", herein. This amount of maximum differential surplus energy is much smaller than the maximum full surplus energy. It is thus easier to design such a smaller energy reservoir; which is manageable in technology and also cost-effective.

Figure 1B:
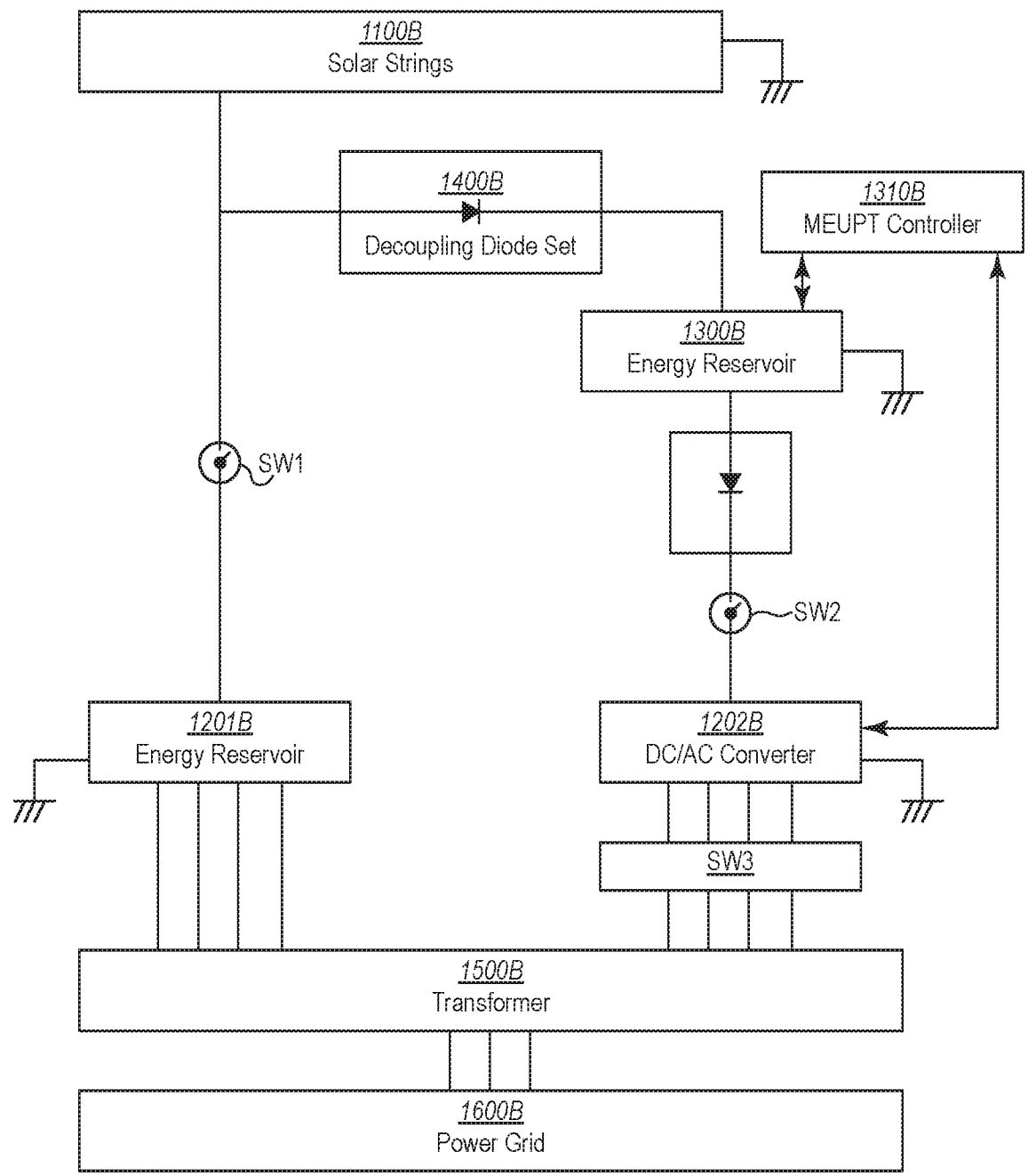

FIG. 1B depicts a block diagram that symbolically illustrates an energy reservoir 1300B that stores surplus power resulting from a power stream produced from a set of solar strings 1100B subtracting out the power drawn by a DC/AC converter 1201B. At the same time, another DC/AC converter 1202B is directed by the MEUPT controller 1310B to receive approximately the same amount of DC energy from the energy reservoir 1300B (containing the surplus power). Both of the DC/AC converters 1201B and 1202B simultaneously convert received DC energy to AC power, and provide that AC power to the same grid 1600B through the same transformer 1500B. In doing so, the net energy storage burden to the reservoir 1300B can be reduced to a very small capacity when compared with that of the reservoir 1300A depicted in FIG. 1A.

Figure 1C:
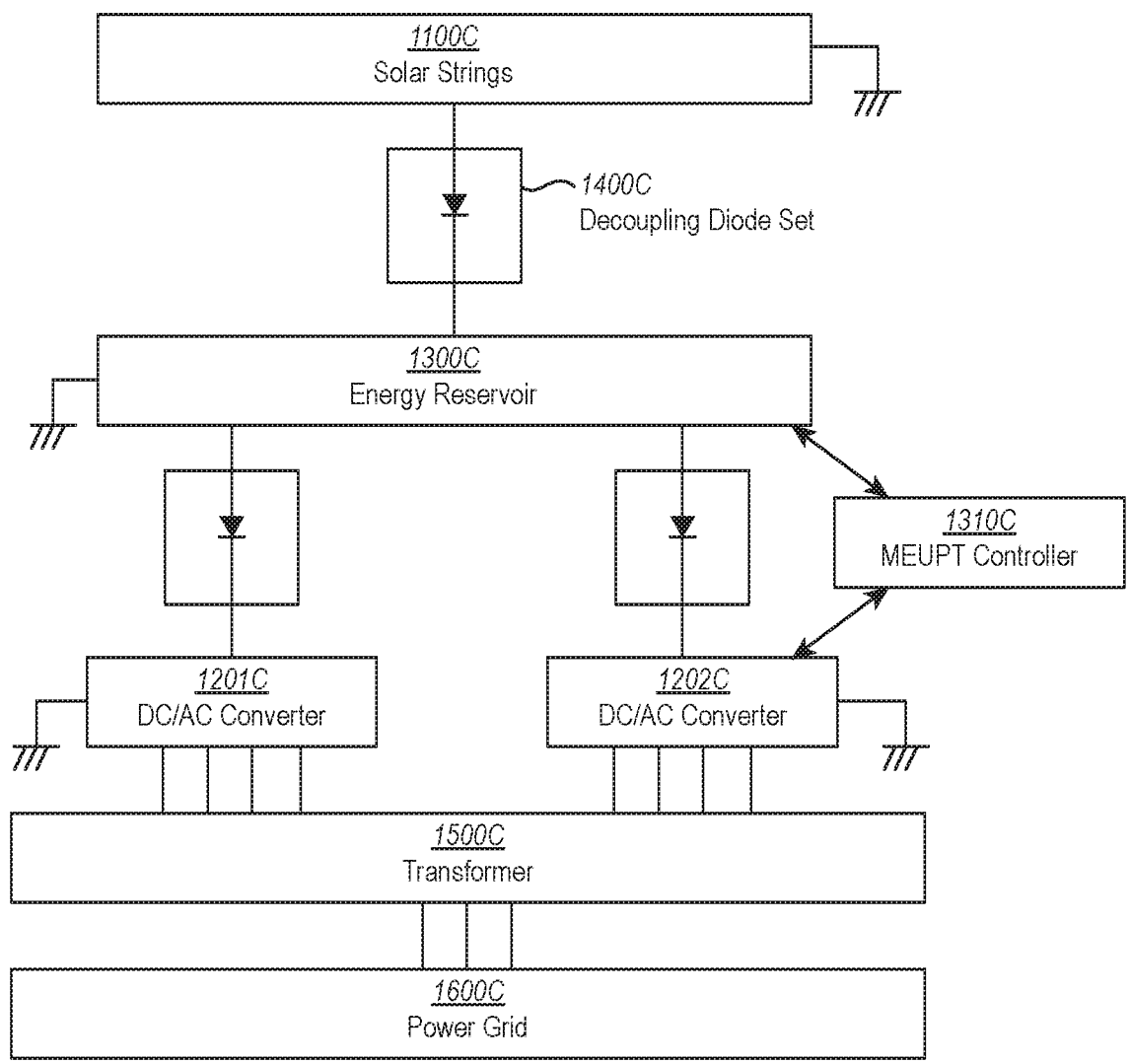

FIG. 1C depicts a configuration that is modified from the configuration depicted in FIG. 1B, but has approximately the same performance of the configuration depicted in FIG. 1B. As depicted in FIG. 1C, an energy reservoir 1300C stores the DC power stream produced by PV solar strings 1100C through a diode set 1400C. Two DC/AC converters 1201C and 1202C are directed by the MEUPT controller 1310C to receive (in the aggregate) approximately the same total DC power from the energy reservoir 1300C in an amount that approximately equals the DC energy input produced by the PV strings. Thus, there is only a very small net power input balance in the inputs and outputs of the reservoir 1300C. Both 1201C and 1202C simultaneously convert the received DC power to AC power provided to the same grid 1600B through the same transformer 1500C.

In summary, as depicted in FIG. 1B (when properly decoupled) the energy reservoir can extract and store the surplus energy in the form of a remaining oscillating power train that remains after the produced DC power is extracted by an energy extractor (which can be built-in as a module of the DC/AC converter 1201B). The other DC/AC converter 1201B is designed to extract an approximately equal amount of energy out of the energy reservoir 1300B to reduce the net amount of surplus energy stored into the reservoir. Thus, a relatively small reservoir is adequate.

Also as depicted in FIG. 1C, (when properly decoupled) the energy reservoir 1300C can receive all the produced DC power from the PV strings 1100C. An oscillating power train is then extracted by the DC/AC converters 1201C and 1202C, while the surplus energy (the left-over power) is also implicitly stored within the energy reservoir 1300C in the form of a 90° out of phase remaining oscillating power train. As can be seen, this surplus energy is also implicitly automatically extracted and stored into the reservoir 1300C.

Applying either design depicted in FIG. 1B (or FIG. 1C), the designed energy reservoir can serve as the energy reservoir purposed for an MEUPT optimizer; which temporarily stores small amount of net surplus energy that is 90° out of phase. The hard task of energy reservoir design is now shifted to the task of designing a proper MEUPT controller.

Section Five: Necessary Functions of the MEUPT Controller

The controller should be able to direct the associated DC/AC converter(s) to consistently draw a proper amount of energy from the reservoir that is substantially equal to the amount in the surplus power charging into the reservoir. In doing so, one can minimize the net amount of energy storage into the reservoir; and maintain adequate balanced energy storage in the reservoir to stabilize system operation. When so doing, the energy reservoir only needs to store (or to provide) the energy difference between the charging surplus power and the power drawn by the DC/AC converter(s) within a small time duration.

With a capable controller, the energy difference can be designed to be manageably small. The time duration can be designed to be long enough to ramp up or down for the DC/AC converter(s) in matching the surplus energy; and short enough to significantly reduce the capacity of the reservoir while still keeping the system operation stable. The estimated reservoir's capacity can thus reduce to be less than 0.001 times that of the maximum full surplus energy. This capacity is less than 2 Faradays per 1 MW PV power station; a manageable charge capacity even if using thin film capacitors. An example of a suitable MEUPT controller will be described below with respect to sections Twelve through Fourteen below.

Section Six: Capacitor/Battery Combined Energy Reservoir

Another issue is that a good thin film capacitor can last for 10 to 15 years while still keeping greater than 80 percent of its original capacitance, while a good battery can last less than 5 years and have approximately 70 percent of its charge capacity after that time. Therefore, a careful design balance is suggested to optimize the economic costs. Furthermore, the amount of energy in the reservoir should be big enough to stabilize operation at all time. Design simulations show that with the present prices of thin film capacitor and batteries, a typical 20 years' optimum energy reservoir design for 1 MW PV station is a design with 0.1 to 1 Faraday thin film capacitors combined with an approximate 50 ampere-hour auto battery string with a suitable operating voltage.

Section Seven: Preventing Mutual Power Annihilation in PV Strings

As described above, the decoupling technique applied in FIG. 1B and FIG. 1C allows the strings of solar panels to charge the energy reservoir; but prevents the power from flowing back from the reservoir into the PV solar strings. When apply the decoupling diode set properly, this technique not only prevents the energy leakage from the reservoir through the PV solar panel strings, but also can prevent a phenomenon discovered by the inventors. This phenomena is referred to herein as the "mutual power annihilation among PV strings phenomena", the "mutual power annihilation phenomena", or the "power annihilation phenomena".

This phenomenon occurs when parallel-connected several PV strings collect the produced power. This phenomenon is especially pronounced when the parallel-connected PV strings having very different I-V characteristics, photo-electric conversion efficiencies, and/or maximum power production voltages.

For instance, when less than all of the solar panels in less than all of the strings are casted with shadows, the strings that are within the shadow will have lower photo-electric conversion efficiency than those that are outside of the shadow. In other words, these solar strings would have very different I-V characteristics even at the same time of day, due to different casting of shadows. When these solar strings are connecting in parallel, the high efficiency strings can discharge part of their produced electric power to the lower efficiency solar strings to disrupt the power production in the PV solar strings. The inventors have confirmed this phenomenon experimentally. Experiments also show that this phenomenon can be prevented when PV solar strings are properly decoupled.

Furthermore, the power annihilation phenomenon can also occur when parallel-connected PV strings have very different maximum power production voltages. For instance, suppose that there are two solar panel strings connected in parallel-connected—one having 15 stringed solar panels and another having 19 stringed solar panels. The power generated in the string with 19 panels will definitively flow through the string with 15 panels and the power annihilation phenomenon occurs. Experiments show that the power received from the above parallel-connected two strings can reduce to less than half of that produced by the string with 19 panels alone. When properly decoupled, the power received from the above two parallel-connected strings can recover to about 1.53 times that produced by the string with 19 panels alone. The above described experiment shows that (a) the mutual power annihilation phenomenon does exist; and (b) properly decoupling techniques can prevent the phenomenon.

In one other experiment, a PV plant was arranged to have two power production units; each unit consisting of 85 solar panels of the same maker and model. Each of the two power product units was configured with five (5) parallel-connected PV strings to collect the produced DC energy. Two PV strings were configured with series-connected 15 panels, two strings with series-connected 17 panels, and another string with series-connected 21 panels. When these 10 strings' maximum power production voltages are measured separately at high noon with clear skies, the maximum power production voltages ranged from 420 volts as the lowest to 610 volts at the highest. Thus, these parallel-connected PV solar strings have very different maximum power production voltages under the same clear sky.

Each of the power production units converts the collected DC power via a different DC/AC converter into AC power. To measure the energy and power produced in each production unit, a kilowatt-hour meter and a watt meter were connected to the AC output of each of the DC/AC converters of each production unit. These units were then connected to a transformer to provide the AC power to a grid. With 72 identical readings of the two power meters over a 36 day period, and with identical readings of the two kilowatt-hour meters at the end of the 36 day period, it is confirmed that all elements in these two power production units (including the two sets of measuring meters) were substantially identical.

One power production unit was then modified to be configured with 4 strings of 21 panels (and 1 panel not in use); while the other power production unit was left unchanged from the above described 5 strings. The measured power production of the modified power production unit was typically greater than 4.1 times that of the other power production unit at high noon and clear skies. We then measured sixty (60) days of cumulated energy provided, which was derived from the readings of the two kilowatt-hour meters. The modified power production unit provided energy to the grid of 3.38 times that of the unmodified power production unit. The above experiments clearly and definitively proved that the mutual power annihilation phenomenon does indeed exist in parallel-connected PV strings; especially with strings having very different I-V characteristics or very different maximum power voltages.

To conclude, proper decoupling technique in accordance with the principle described herein can prevent energy leakage from the energy reservoir through solar strings; and also can prevent the discovered mutual power annihilation phenomenon among PV strings.

Section Eight: Experiments that Prove Existence of Surplus Energy

Before describing the designs of MEUPT optimizer, this section describes experiments to definitively proof the existence of surplus energy in such PV power stations; which is predicted by the referenced patent publications, US2016/0036232 and US2017/0149250 A1. To reiterate, the referenced patent publications define surplus energy as the electric energy produced but not extracted and/or utilized before being turned to heat. Specifically, in a PV power station, "surplus energy" includes left-over electric energy that exists after the produced DC energy is extracted and converted to AC power by 3-phase DC/AC converters. An MEUPT optimizer can be designed to capture/utilize this left-over electric energy, the surplus energy. The following describes the experimental set-ups and the step-by-step executions of the experiments.

Figure 2A:
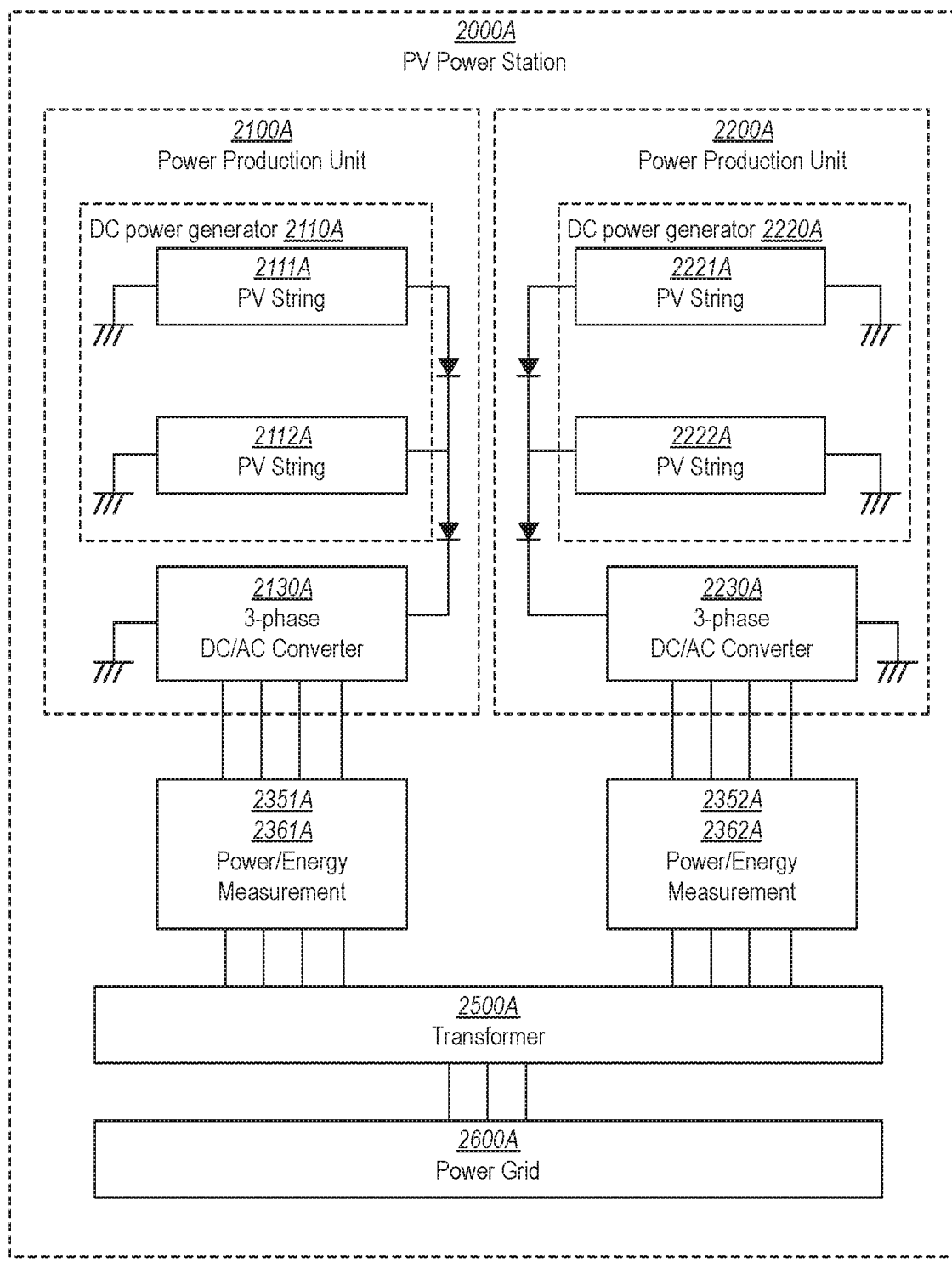
FIG. 2A illustrates a block diagram of a power station that was set up in an experiment, and in which there are two AC power production units that are set up conventionally, and with power and energy meters that measure output of each power production unit.

FIG. 2A depicts the starting set up of a PV power station 2000A comprising 2 AC power production units 2100A and 2200A. Each of the AC power production units 2100A and 2200A practices blind MPPT conformation; and provides 3-phase AC power to a power grid 2600A. The AC power production unit 2100A consists of a DC power generator 2110A and a 3-phase DC/AC (15 kW) converter 2130A. The AC power production unit 2200A consists of a DC power generator 2220A and a 3-phase DC/AC (15 kW) converter 2230A. The power generator 2110A uses 2 parallel-connected PV strings 2111A and 2112A to generate DC electricity. The power generator 2220A uses another 2 parallel-connected solar strings 2221A and 2222A to generate DC electricity. Each of the 4 PV strings consists of 25 series-connected solar panels; each panel capable of producing 250 W of power at high noon and with clear skies.

The DC power generator 2110A supplies DC power to the 3-phase DC/AC converter 2130A; and the DC power generator 2220A supplies DC power to the 3-phase DC/AC converter 2230A. These two converters 2130A and 2230A then convert the supplied DC power into 3-phase AC power. In the experiment, the AC output power of the power production units 2100A and 2200A were measured by two 3-phase AC watt-meters (in kW) 2351A and 2352A, respectively. The AC energy production (in kW*hour) of these two power production units 2100A and 2200A were also measured by two kW-hour-meters 2361A and 2362A, respectively. The produced 3-phase AC power was then provided to the grid 2600A via transformer 2500A. The PV power station was operated; and the energy production of the two AC power production units 2100A and 2200A was measured for 7 days.

The readings of the two kW-hour-meters showed equal values every day during this time period. This provides high confidence that all elements of these two power production units 2100A and 2200A (including the two set of instruments for measurement) are substantially identical. After this step, one of the two AC power production units 2200A was kept unchanged, while the other AC power production units 2100A was modified with a different configuration 2100B as depicted in the left hand side of FIG. 2B.

Figure 2B:
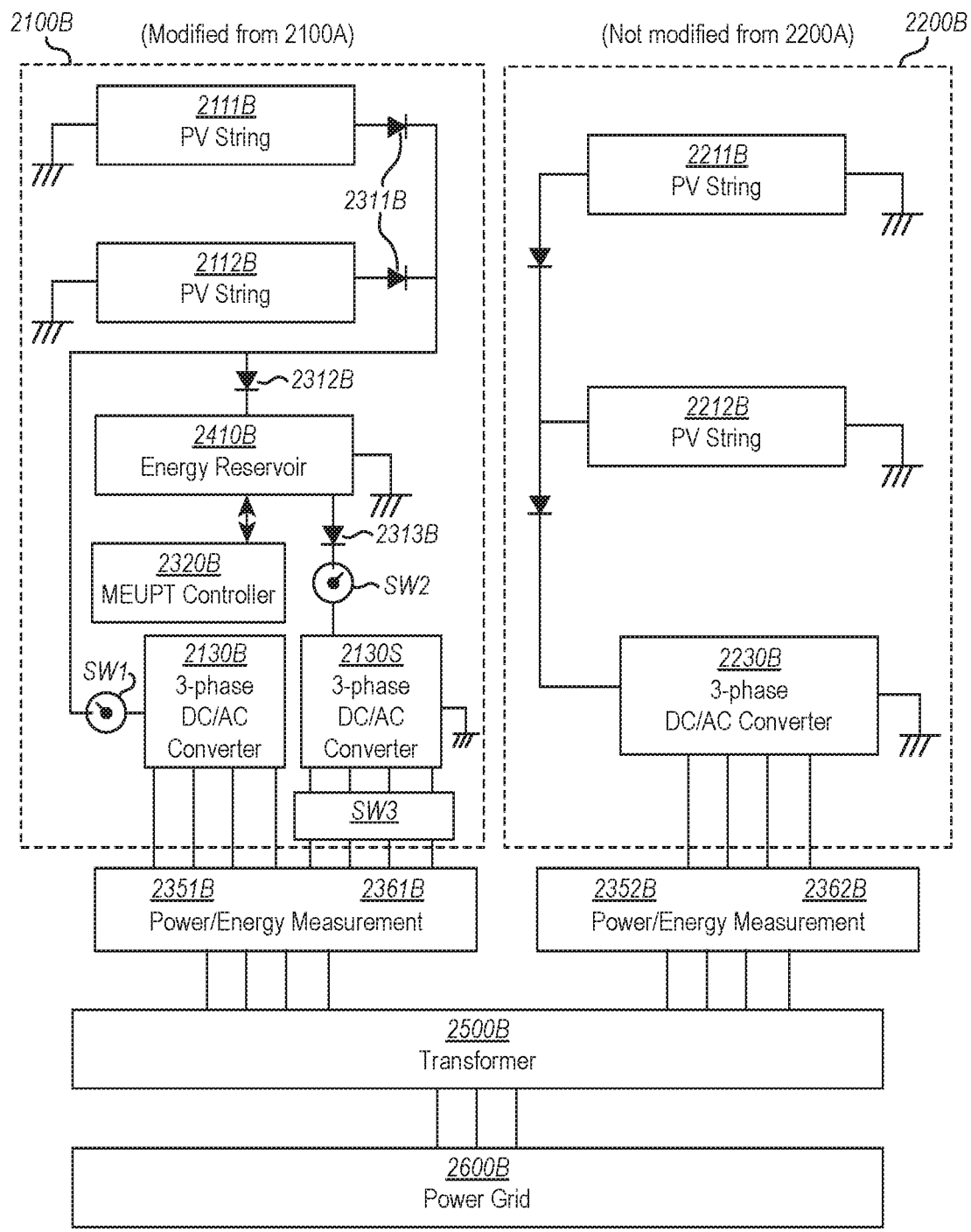
FIG. 2B illustrates a block diagram of the power station of FIG. 2A after modification to including decoupling devices and an energy reservoir, and that was used to verify improved energy output to the grid.

The power production unit 2200B of FIG. 2B is the power production unit 2200A of FIG. 2A unmodified. Also, the elements 2351B, 2361B, 2352B, 2362B, 2500B, 2600B of FIG. 2B are the same as the elements 2351A, 2361A, 2352A, 2362A, 2500A, 2600A, respectively, of FIG. 2A. Furthermore, although the configuration of the power production unit 2100B is different in FIG. 2B than the power production unit 2100A of FIG. 2A, some of the elements of the power production unit 2100B of FIG. 2B are the same as those that are included within the power production unit 2100A of FIG. 2A. For instance, the PV strings 2111B and 2112B of FIG. 2 are the same as the PV strings 2111A and 2112A, respectively, of FIG. 2A. Likewise, the DC/AC converter 2130B of FIG. 2B is the same as the DC/AC converter 2130A of FIG. 2A.

The following six (6) steps describe how the power production unit 2100A was modified into the configuration of 2100B, and is described with respect to the left hand side in FIG. 2B. Step 1 was to add a set of decoupling diodes 2311B in-between the solar strings 2111B and 2112B and the 3-phase DC/AC converter 2130B, which is practicing the blind MPPT conformation. Step 2 was to add an energy reservoir 2410B into the configuration. Step 3 was to connect the energy reservoir 2410B to the DC terminals of the DC/AC converter 2130B through another set of decoupling diodes 2312B and through a switch SW1. Step 4 was to add another 3-phase DC/AC converter 2130S (20 kW) into the configuration, which converter 2130S was operated in according with the direction of a designed MEUPT controller 2420B. Step 5 was to connect the DC/AC converter 2130S to the energy reservoir 2410B through another set of decoupling diodes 2313B and through a switch SW2. Step 6 was to connect the output terminals of the converter 2130S to the power and energy measurement instrument set 2351B and 2361B through a switch SW3. Note that the referenced "decoupling diode set" may be those diodes that are termed "blocking diodes" in the art. Note also that switches SW1, SW2, and SW3 are added as depicted in FIG. 1B, such that the relevant devices can be introduced to (or removed from) the experiments at a proper time in the designed experimental execution steps described below.

The first night after the above modification was made; the SW1 was turned on while the switches SW2 and SW3 were turned off. The converters 2130B and 2230B started to run early the next morning. The power meters 2351B and 2352B measuring the two outputs of the power production units 2100B and 2200B showed the same reading. The reservoir 2410B also began charging up as indicated by measurement of the high terminal voltage of the reservoir 2410B. The system operated as described for the whole day first day. The measured energy provided from the two power production units 2100B and 2200B were equal; as shown in the readings of the kW-hour-meters 2361B and 2362B. This experimental step demonstrated that the added decoupling diode sets 2311B and the reservoir 2410B did not change the power and energy productions of the power production unit 2100B.

The switches SW1, SW2, and SW3 were turned on the night after first day operation (the second night). The converters 2130B and 2230B started to run early in the early morning (the second day), while the converter 2130S started to run at lower power conversion level at about 15 minutes after the converters 2130B and 2230B started to run. Thereafter, the converter 2130 increased its conversion power level about every 2 minutes; that is consistent with the controller design and increment of the reservoir energy level. The reading of the power meter 2351B (for unit 2100B) reached about double of reading of the power meter 2352B (for unit 2200B) for the entire day—until nearly sunset. The energy provided from the two power production units 2100B and 2200B by the end of the second day were derived from the two kW-hour-meters' readings. The result showed that the energy provided from the modified power production unit 2100B was more than double the energy provided from the unmodified power production unit 2200B. For the following six consecutive days, the switches SW1, SW2 and SW3 remained on, and the energy provided from the modified power production unit 2100B was consistently more than double that of the power production unit 2200B each day.

The next night, the switches SW2 and SW3 were turned off. The measured energy provided from the power production units 2100B and 2200B returned to the same level for the followed 5 consecutive days during with switches SW2 and SW3 remained off. The next night, switches SW2 and SW3 were turned on again. The measured energy production of the power production unit 2100B became again more than double that of the power production unit 2200B every day for the following 5 consecutive days with switches SW2 and SW3 remaining on.

As described above, the step-by-step execution of this experiments definitively proves the existence of the referenced surplus energy in PV power station as the referenced patent publications (US2016/0036232 and US2017/0149250 A1) predicted. Specifically in a PV power station when the produced DC energy is extracted by a 3-phase DC/AC converter, left-over energy still exists. The MEUPT optimizer can capture and utilize this surplus energy to increase the electricity provided to the power grid.

Section Nine: Configurations of the Designed MEUPT Optimizer

The modified power generation unit 2100B (as described above and depicted in FIG. 2B) can serve as an example of a PV power generation unit incorporating an MEUPT optimizer. In this case, the MEUPT optimizer comprises three decoupling diode sets 2311B, 2312B, and 2313B; a reservoir 2140B, and an MEUPT controller 2320B. Notice that the decoupling diode set is referred as the "decoupling device", hereinafter.

The connections of the MEUPT optimizer modules are depicted in FIG. 2B and described above. Note that the surplus energy is passively extracted by the energy reservoir 2410B in this embodiment. Another power extractor is included as a module in the 3-phase DC/AC inverter 2130S, which extracts the surplus energy that is stored in the reservoir 2410B. The AC power conversion level of the converter 2130S is regulated by the MEUPT controller 2320B such that the power charges into the energy reservoir 2410B is approximately balanced with the power discharged from the energy reservoir 2410B. Therefore, the "net" power charged into the reservoir within a period can be as small as desired. Smaller net power charges have the benefit of allowing for a smaller energy reservoir 2410B, at the expense more strict control by the MEUPT controller 2320B.

Figure 3:
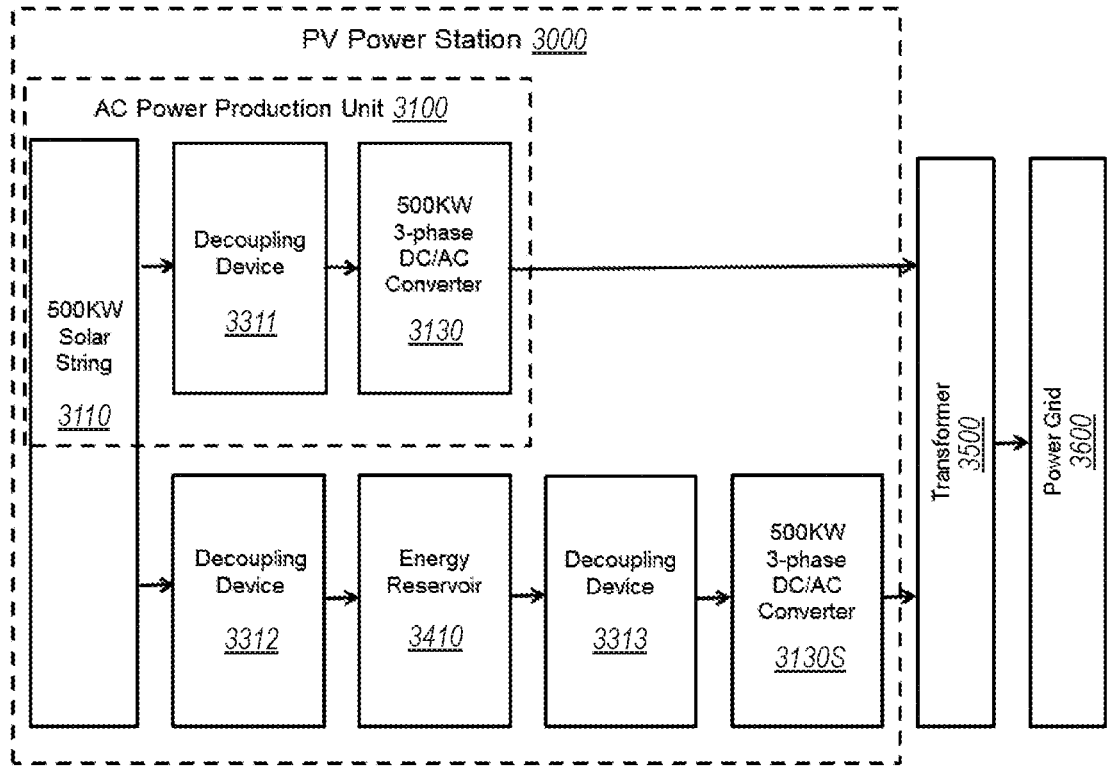
FIG. 3 illustrates a block diagram of a power station in which there are two channels of power delivery, one channel invoking the use of an energy reservoir, and one not invoking the user of the energy reservoir.

Another embodiment is depicted in FIG. 3. This embodiment illustrates a configuration of the PV power station 3000 incorporating an MEUPT optimizer which comprises only one AC power production unit 3100 which uses 500 kW solar panels 3110 to convert solar power into DC electric power. In other words, the AC power production unit 3100 consists of a DC power generator 3110 and a 3-phase DC/AC (500 kW) converter 3130. The power generator 3110 uses 80 parallel-connected solar strings to generate DC electricity. Each of the 80 solar strings consists of 25 series-connected solar panels; each panel is declared to have 250 W DC power production capability at high noon and clear skies. Note that this DC generator 3110 is referred as a 500 kW electrical power generator (80*25*250 W=500 kW); and this PV power station is referred to as a 500 kW PV power station.

As depicted in FIG. 3, the power generator 3110 supplies DC power to a 3-phase DC/AC converter 3130 (with declared 500 kW) through a decoupling device 3311. The generator 3110 also supplies DC power to the energy reservoir 3410 through decoupling device 3312, and servers as a DC energy source that charges the energy reservoir 3410. Therefore, the surplus energy is passively extracted by the reservoir 3410. The reservoir 3410 then supplies (or discharges) DC power to another 3-phase DC/AC converter 3130S (with declared 500 kW) through decoupling device 3313. The converter 3130 operates as an MPPT optimizer, while the converter 3130S operates as an MEUPT controller. Converters 3130 and 3130S convert the separately supplied DC power into 3-phase AC power and deliver to power a grid 3600 via the same transformer 3500.

Notice that the DC/AC converters used in the above descriptions can be categorized into two types; namely, one type that receives its DC power directly from the PV solar strings, and another type that receives its DC power from the energy reservoir. When the type of converter distinction is necessary in the disclosure and in the following detail description, the one receiving DC power from PV solar strings is also referred as the "PS DC/AC converter"; while the other one receiving DC power from the energy reservoir is also referred as the "ER DC/AC converter" herein. When the distinction is necessary in the cases that use 3-phase DC/AC converters in this disclosure, converters will also be categorized and referred to herein as "PS 3-phase DC/AC converter" and "ER 3-phase DC/AC converter", respectively.

Figure 4:
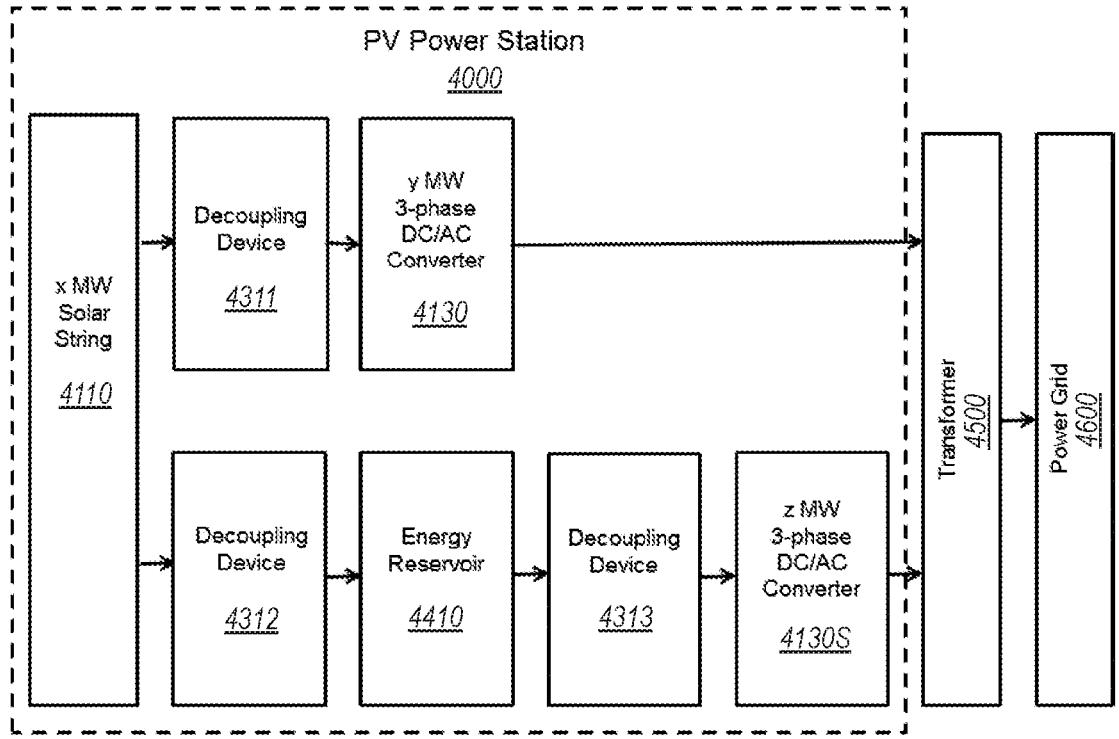
FIG. 4 illustrates a block diagram of a power station that represents a broader embodiment of FIG. 3.

To reiterate at a broader level; as the configuration depicted in FIG. 4 shows, this MEUPT optimizer provides optimization service to an x MW PV power station which has properly arranged solar panel strings with rated x MW power generation capability. The produced DC power is extracted by a maker declared y MW "PS 3-phase DC/AC converter" 4130 through a decouple device 4311. The left-over power is charged into an energy reservoir 4410 through another decoupling device 4312; thus extracting and storing the surplus energy. The stored surplus energy is then converted by another maker declared z MW "ER 3-phase DC/AC converter" 4130S through another decoupling device. One of the converters 4130 is regulated by an MPPT optimizer while the other converter 4130S is regulated by a MEUPT controller. Both converters convert proper amount of DC power into 3-phase AC power; and provide the 3-phase AC power to a power grid 4600 via the same transformer 4500. Notice that x=y=z=0.5 in this configuration.

Figure 5:
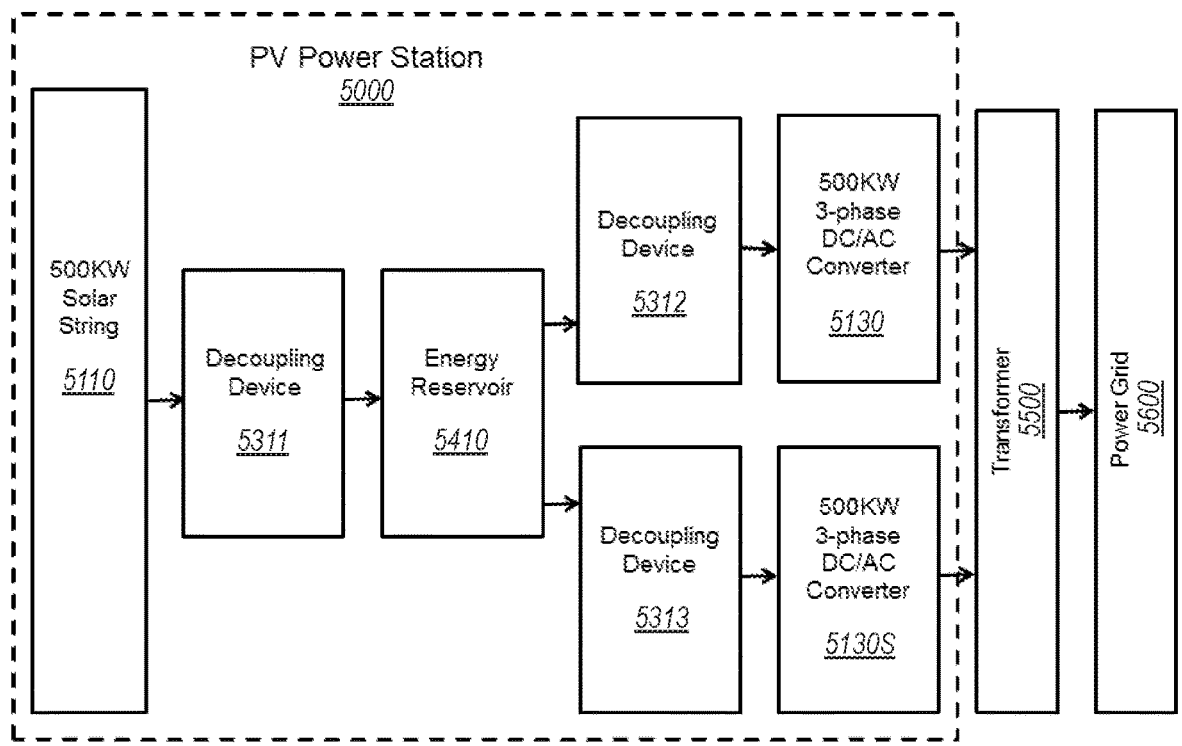
FIG. 5 illustrates a block diagram of a power station in which power is delivered via the use of an energy reservoir.

FIG. 5 depicted another embodiment of incorporating an MEUPT optimizer in a large PV power station. The power station is equipped with rated 0.5 MW solar panel strings 5110 and two declared 500 kW 3-phase DC/AC converters 5130 and 5130S. This embodiment illustrates another configuration for the MEUPT optimizer. The PV power station 5000 can be thought of as comprising one AC power production units (hereinafter referred to also as "AC power production unit 5100"). The AC power production unit 5100 consists of a DC power generator 5110 that is comprised of rated 500 kW solar panels, and two 3-phase DC/AC (each declared as 500 kW) converters 5130 and 5130S. The power generator 5110 uses 80 parallel-connected solar strings that generate DC electricity. Each of the 80 solar strings consists of 25 series-connected solar panels; each solar panel rated to have 250 W power production capability. The energy reservoir 5410 receives the DC electric power from the generator 5110 through a decoupling device 5311. The two 3-phase DC/AC converters 5130 and 5130S receive DC power from the reservoir 5410 through two separate decoupling devices including decoupling device 5312 for the converter 5130, and decoupling device 5313 for the converter 5130S. Converters 5130 and 5130S are regulated by the MEUPT controller to draw the appropriate amount of power from the reservoir 5410, and convert the DC power to 3-phase AC power to provide to the power grid 5600 via transformer 5500.

To more broadly elaborate on the configuration depicted in FIG. 5: the MEUPT optimizer provides optimization service to an x MW PV power station. This PV power station has one AC power production unit with solar panel strings having a total rated DC power generation capability x MW. The DC generator charges an energy reservoir through a decoupling device. The energy reservoir supplies DC electricity to two 3-phase DC/AC converters through two separate sets of decoupling devices. The total maker declared conversion capability of the two "ER 3-phase DC/AC converters" is $z_1+z_2=z$ MW. The two converters are regulated by a MEUPT controller to convert a proper amount of DC power into 3-phase AC power. The electricity produced by the two converters is provided to a power grid via the same transformer. The above described configuration is redrawing and depicted in FIG. 6. Please notice that x=0.5, y=0, z=1 in this configuration.

Figure 6:
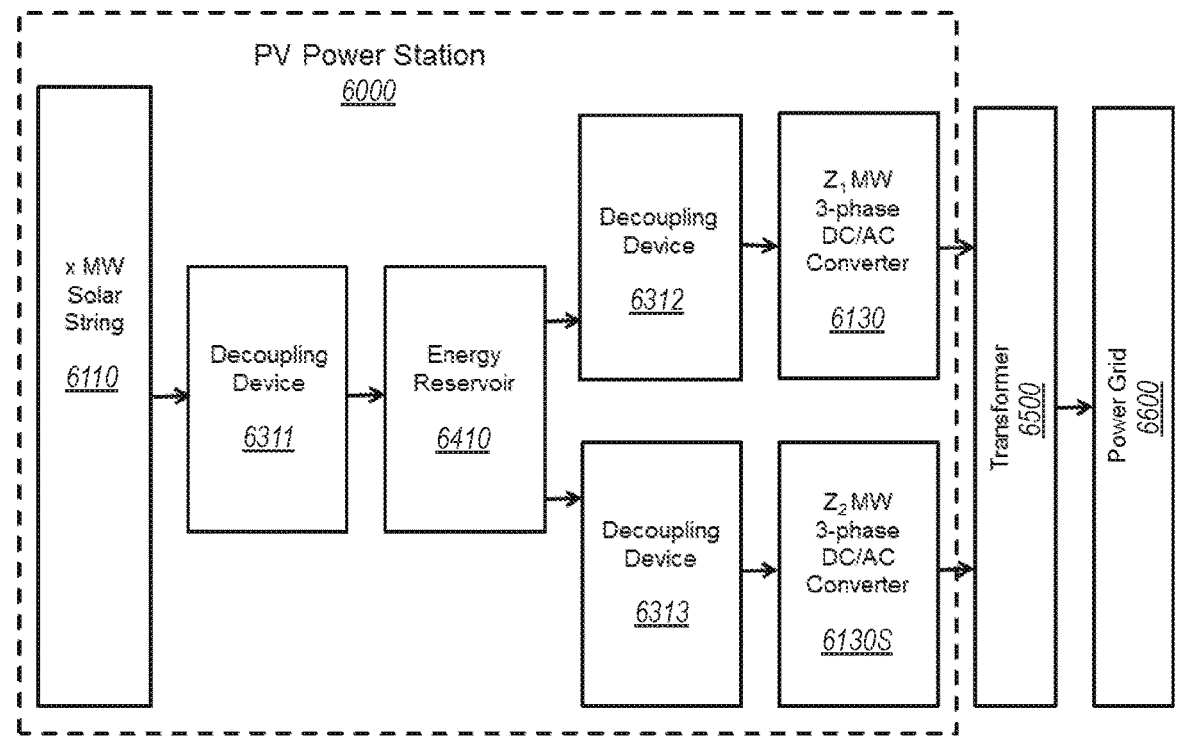
FIG. 6 illustrates a block diagram of a power station that represents a broader embodiment of FIG. 5.

This description will now compare the two configurations depicted in FIGS. 4 and 6. In the configuration depicted in FIG. 4, the DC generator supplies DC power to a "PS 3-phase DC/AC converter" with maker declared capability of y MW; and charges the left-over power to an energy reservoir. In FIG. 4, the energy reservoir supplies DC power to an "ER 3-phase DC/AC converter" with maker declared capability of z MW. With no "PS 3-phase DC/AC converter" in the configuration depicted in FIG. 6 (i.e., y=0), all generated DC power charges into an energy reservoir through a decoupling device; and the energy reservoir supplies DC electricity into two "ER 3-phase DC/AC converters" through two separate sets of decoupling device. Therefore, x=y=z=0.5 in configuration of FIG. 3; while x=0.5, y=0, z=1 in the configuration of FIG. 6. In one further embodiment of FIG. 6, there is no energy reservoir 6410. Instead, the solar strings 6110 provide DC power to the converters 6130 via decoupling device 6311.

Now, the only remaining design issue for the MEUPT optimizer is to identify the optimum power matching relationship between the parameters representing the rated capability of the solar strings and that of the converters. Specifically, the task is to identify the relationship between the value of x, y, and z in the optimum situation. As a reminder, the value of the sum y+z is no greater than the value x in a conventional PV power station as described in Section Two.

Notice also that the value x is designated for the MW value of rated DC power production capability of the PV strings; the value y is designated for the total MW value of maker declared capability of "PS 3-phase DC/AC converter" that converts the DC energy supplied by the PV strings; while the value z is designated for the total MW value of maker declared capability of "ER 3-phase DC/AC converter" that converts the DC energy supplied by the energy reservoir.

For instance in FIG. 6, the x equals to 0.5, the 0.5 MW makers' declared total PV capability; the y equals to 0 that means no "PS 3-phase DC/AC converter" is installed; the z equals to 1, which means the 1 MW total maker's declared capability of the two "ER 3-phase DC/AC converters" is incorporated for receiving DC power from the energy reservoir and converting the DC energy into 3-phase AC power. Note that the value of y+z is no less than 2 times the value of x value in both of the configurations described above. The term "capability" is also referred as the "power rating" of the device; and inter changeable hereinafter, unless otherwise indicated.

Section Ten: The Optimum Power Matching Relationship.

Due to different disciplines (industries), the definition of the power rating for solar panels is different from that of the DC/AC converters. The power rating of the solar panels is defined as the maximum DC power that a solar panel can produced at high noon with clear skies. The solar panel manufacturing industry uses a predetermined type of illuminating lamp (called herein a "standard lamp") to simulate clear skies; and high noon is simulated by illuminating light flux perpendicularly through the solar penal surface. Therefore, the maker declared power production capability can be very close to the real DC generator's capability. Experiments performed by the inventors also confirm the above statement. The total DC power generation capability of PV solar strings is therefore judged to be credible; and the title "maker declared capability" is omitted herein when describing the power rating of the solar strings. On the other hand, the DC/AC converter manufacturing industry defines the power-rating of DC/AC converters in according with the convention of power grid industry, referred as the "power grid convention" herein. This convention and the definition of the DC/AC converter capability are elaborated as follows.

The AC Power grid industry enforces a convention (referred as the power grid convention) to assure the constructed 3-phase AC power grid can fulfil the declared power delivery capability. The 3-phase AC power grid consists of 3 or 4 power lines which can deliver time varying sinusoidal functions of voltage and current in each pair of power lines as one phase. The power grid convention defines the voltage declared in the specification as the "standard" maximum voltage for the power lines to endure (referred to as the "line voltage"). Likewise the specified maximum current declared in the specification is the maximum current for the power lines to carry (referred to as the "maximum phase current"). When a device is manufactured to conform to the power grid convention, the voltage declared in the specification of the device is the maximum voltage that all the related components shall endure. Likewise, the maximum current declared in the specification is the maximum current-carrying capability for all the related components of one phase, connecting to one pair of power lines. The time varying functions of the device's voltage and current also need to conform to the sinusoidal function of the each phase in the AC power grid.

To reiterate, the specified voltage of a 3-phase DC/AC converter is defined as the line voltage of the 3-phase power; the specified maximum current is defined as the maximum current carrying capability of the pair of power lines for each phase; and the specified maximum power is defined as the sum total of the maximum power capability that the three phases can endure. In other words, when conforming to the power grid convention, the power lines of each phase and the connected power devices are to be capable of transmitting one third (⅓) of the specified maximum power, to state in other way, the "maker declared power rating" of the 3-phase DC/AC converter is 3*U*I, where the U is the phase voltage and the I is the phase current. Each pair of power lines is capable of delivering U*I power, or ⅓ of "maker declared power rating"; and each module connecting to the pair of power line is also required to carry or deliver ⅓ of the specified power rating declared, when conforming to the power grid convention.

For instance, take a 3-phase DC/AC converter specifying "AC voltage=315 VAC; maximum current=916 amperes; and the maximum power output=500 kW" as an example. The specification "AC voltage=315 VAC" should be read as: "the output line voltage of this converter is 315 volts". Or, when the 3-phase is balanced, the phase voltage U of every phase is U=315/1.732=181.9 volts (where 1.732 is the square root of 3 which is the ratio of the line voltage to the phase voltage). The specified "maximum current=916 amperes" should be read as that the power lines and all the components in each phase are designed to assure the current carrying capability of I=916 amperes. The specified "maximum power output=500 kW" should be understood as the maximum power conversion and delivery capability of all components of each DC/AC conversion phase=U*I=181.9*916=500/3 KW; and the total maximum power conversion and delivery capability of the related modules in the 3 conversion phase is the sum of each phase, 3*U*I=3*181.9*916=500 kW, which is the defined "maker declared power rating"=3*U*I when conforming to the power grid convention stated in previous paragraph.

The 3 phases in a 3-phase DC/AC converter are strictly correlated to have 120° phase differences. In other words, one pair of power lines (phase) delivers time varying power of $U*I \sin^2(\omega t)$; while the second phase delivers time varying power of $U*I \sin^2(\omega t+120°)$; and the third phase delivers time varying power of $U*I \sin^2(\omega t-120°)$. Each pair of power lines of the three phases delivers three oscillating AC power trains related to each other with a strict correlation. Note that the power conversion capacity, P(t), is not equal to the defined "maker declared power rating". The power conversion capacity, P(t), is expressed as a function of time and derived in accordance with the defined 3-phase AC power restrictions.

In other words, the DC/AC power conversion capacity, P(t), is derived from the sum of the time varying power outputs of the 3 phases; with a strictly correlated phase difference of 120°; and with power wave forms that conform to the square sinusoidal oscillations of $\sin^2(\omega t)$, or $\cos^2(\omega t)$; and synchronized with the power grid (same phase and frequency) which forces the angular frequency ω to be constant.

Now, let us derive the time varying power conversion capacity, P(t) of the 3-phase DC/AC converter. The power conversion capacity of a 3-phase DC/AC converter as function of time is $P(t)=U*I*(\sin^2(\omega t)+\sin^2(\omega t+120°)+\sin^2(\omega t-120°))$. As defined above, U is the phase voltage, I is the phase current, and ω is the constant angular frequency of the power grid. Also, it can be shown that $\sin^2(\omega t+120°)+\sin^2(\omega t-120°)=\cos^2(\omega t)+½$. Therefore, the power conversion capacity, P(t), of a 3-phase DC/AC converter as function of time is $P(t)=U*I*(\sin^2(\omega t)+\sin^2(\omega t+120°)+\sin^2(\omega t-120°))=U*I*(\sin^2(\omega t)+\cos^2(\omega t)+½)=U*I*(1+½)=3/2(U*I)$.

In other words, the sum total of these strictly correlated three pulsating power trains in the three phases is a constant. In other words, the sum total power delivery of these three pair of power lines is a constant. Or the sum total of the three modules related to the three phases is a constant. However, this constant is only equal to half (½) of the "declared power capability". This is the relationship between the power conversion capacity and the defined "declared power capability" of a 3-phase DC/AC converter when conforming to the power grid convention.

Please be reminded that as described previously the "maker declared power rating", or the referred "maker declared power capability" of a 3-phase DC/AC converter is 3*U*I, when conforming to the power grid convention. Comparing this with the power conversion capacity derived above, $P(t)=3/2(U*I)$; it is clear that the derived DC/AC power conversion capacity of a 3-phase DC/AC converter is only a half of the "maker declared power capability".

As an example, take again the above described 3-phase DC/AC converter; which specifies "AC voltage=315 VAC; maximum phase current=916 amperes; and the maximum power output=500 kW". In reality, the DC/AC power conversion capacity of this 3-phase DC/AC converter is only 250 kW. To derive the above conclusion, we first confirmed that the declared maximum power, 500 kW is indeed equal to 3*U*I where U is the phase voltage derived from the specified line voltage, and I is the declared maximum current; the power conversion capacity of this converter is equal to 3/2*U*I=250 kW.

The optimum power matching relationship for the parameters x, y, and z (as defined) is that the value of (y+z) shall be no less than that of 2x. Where the related PV power station is composed of x MW PV solar strings; with the "PS 3-phase DC/AC converters" having total "maker declared power capability" of y MW; and with the "ER 3-phase DC/AC converters" having total "maker declared power capability" of z MW. The "PS 3-phase DC/AC converters" and the "ER 3-phase DC/AC converters" can either be operated by one or more MPPT controllers, or by one or more MEUPT controllers. To practice MEUPT optimization, it is preferred to operate all the DC/AC converters by MEUPT controller(s).

Section Eleven: Summaries

Figure 7:
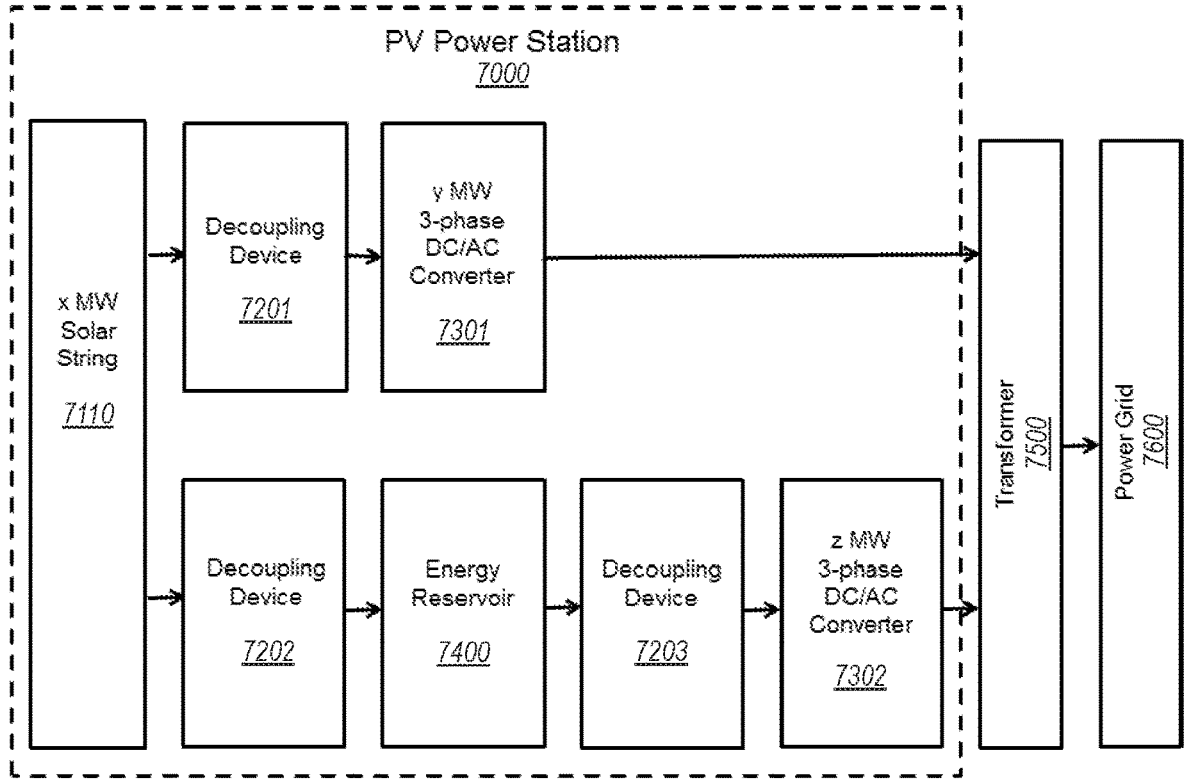
FIG. 7 illustrates a block diagram of a power station.

FIG. 7 abstractly illustrates the configuration of a PV solar power station 7000. The power station comprises x MW solar panels in total arranged in solar strings 7100. The DC power generated in solar strings 7100 provides DC power input to a group of 3-phase DC/AC converters 7301 through a decoupling device 7201; and charges the surplus power into a reservoir 7400 through a decoupling device 7202. The energy reservoir 7400 provides DC power input to a group of 3-phase DC/AC converters 7302 through a decoupling device 7203. Both 3-phase DC/AC converters 7301 and 7302 provide the converted 3-phase AC power to a power grid 7600 through a transformer 7500. The total "maker declared capability" of the converters 7301 is y MW. The total "maker declared capability" of the converters 7302 is z MW. The value of the sum (y+z) is no less than the value of 2x. Please be reminded that when using a similar configuration to describe a conventional PV power station as described in Section Two, the value of (y+z) is no greater than the value of x. Therefore, when a design with value of (y+z) is greater than x or even better 1.1 times x; it means some of the surplus energy can be captured to enhance the electric energy provided to the power grid.

The converters 7301 and 7302 can all be operated by the MEUPT controller(s) described above. In some embodiments, some, one, or even none of the converters are operated by an MEUPT controller. Furthermore, in some embodiments, one or some of the decoupling devices 7201, 7202, and 7203 can be omitted in the configuration. The PV solar strings 7100 provide DC power input to the converters 7301. Therefore, they are referred as the "PS converters" herein. The energy reservoir 7400 provides DC power input to the converters 7302. Therefore, they are referred as the "ER converters" herein. The terms total "maker declared power rating" and total "maker declared power capability" shall be abbreviated as the "declared power" herein.

To reiterate the description of the configuration depicted in FIG. 7: a PV power station 7000 comprises x MW solar strings 7100 as DC power generator. The DC power generator 7100 provides input to the "PS converters" 7301 with "declared power" of y MW, through the decoupling device 7201; and charges the left-over power to the reservoir 7400 through another decoupling device 7202. The reservoir 7400 provides input to the "ER converters" 7302 with "declared power" of z MW through the decoupling device 7203. All the 3-phase DC/AC converters 7301 and 7302 provide the converted 3-phase AC power to a power grid 7600 through a transformer 7500. In some embodiment, the value of (y+z) is no less than the value of 2x. However, when the value of (y+z) is greater than the value of x, the design can receive a partial benefit to enhance the electric energy sale to the power grid.

An MEUPT optimizer in accordance with the principles described herein can serve a small PV power station or a large PV power station comprising one or more AC power production unit(s). Furthermore, with properly designed decoupling device, energy leakage from the energy reservoir through the PV solar strings can be prevented. Furthermore, with properly designed decoupling device, the discovered "mutual power annihilation" phenomenon can be prevented. Also, the energy reservoir can be used to receive only the surplus energy after the energy extraction of the "PS converter", or to receive all the produced DC energy before any extraction. Finally, the MEUPT optimizer can also provide service for PV power station equipped with a single-phase DC/AC converter(s).

Section Twelve: Design Constraints of the MEUPT Controller

Figure 8:
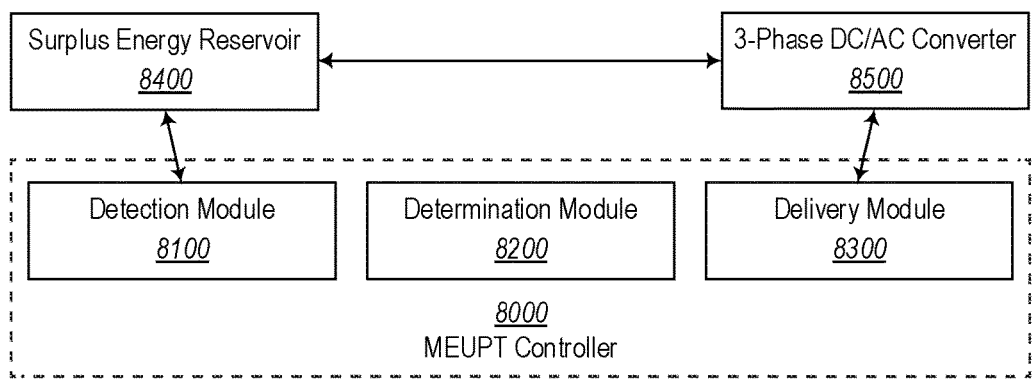
FIG. 8 illustrates a block diagram of a Maximum Energy Utilization Point Tracking (MEUPT) controller in accordance with the principles described herein.

FIG. 8 illustrates a MEUPT controller 8000 (also referred to as a "system controller") that represents an example of the MEUPT controller 2320B of FIG. 2B. The MEUPT controller 8000 is comprised of 3 executable components: a detection component 8100, a determination component 8200, and a delivery component 8300.

The detection component 8100 measures the stored energy level in a reservoir 8400. An example of the reservoir is the reservoir 2410B of FIG. 2B, the energy reservoir 3410 of FIG. 3, the energy reservoir 4410 of FIG. 4, the energy reservoir 5410 of FIG. 5, the energy reservoir 6410 of FIG. 6, and the energy reservoir 7410 of FIG. 7.

A determination component 8200 determines the proper power drawing level to nearly balance the charge provided to and discharged from the energy reservoir 8400.

A delivery component 8300 delivers a coded message of the above determined proper power drawing level to the surplus DC/AC converter(s) 8500. The converters interpret the coded message, and comply with the coded message, such that the converter(s) can continuously operate at the directed power level to nearly balance the in-charging energy. An example of the converters 8500 that draw from the reservoir 8400 are the converters 2130S of FIG. 2B, the converters 3130S of FIG. 3, the converters 4130S of FIG. 4, the converters 5130S of FIG. 5, the converters 6130S of FIG. 6, the converters 7302 of FIG. 3.

In order to derive MEUPT economic beneficial optimizer, the design of the MEUPT controller takes into consideration the following parameters and variables, (1) the capacity of the energy reservoir 8400; (2) the ramping up/down speed of DC/AC converters 8500; (3) the I-V characteristics of the solar strings; (4) the climate at the location of PV power plant; and (5) the ability of MEUPT controller working with the surplus DC/AC converter minimize the difference between (or balance) the amount of charge provided to the energy reservoir, and the amount of charge drawn from the energy reservoir. A straight-forward design can only be derived when applying a custom designed controller for each and every PV power station taking into consideration these parameters and variables.

Section Thirteen: The MEUPT Controller Designs

It is impractical to custom design a MEUPT controller for each and every one PV power station that is to use an MEUPT controller. On the other hand, it is very difficult to pursue a straight forward design for the required MEUPT controller; especially when custom design controllers are not allowed. However, the terminal voltage of the energy reservoir can be viewed as a measure that is influenced by each of the 5 parameters and variables. Therefore, the above 5 design constraints can collapse into two parts when the terminal voltage of the MEUPT energy reservoir is chosen as the determining parameter.

When comparing the measured terminal voltage to a set of site specific "standard voltage intervals"; it became clear to the inventors that the power extraction and conversion level currently executing by the system can be quantized as the power extracting level is (1) too low, (2) too high, or (3) just right. Therefore the MEUPT controller design task can be decouple into 1) an ordinary industrial controller, plus 2) a custom constructed site-specific "standard voltage intervals" table (referred as the "voltage interval table" herein).

Once a site-specific voltage interval table is constructed for the PV power station; the voltage interval table can work in concert with an industrial controller to accomplish the required MEUPT controller functions. The industrial controller is then comprised of a detection component, a determination component, and delivery component as also illustrated in FIG. 8. However, in this case, the detection component 8100 measures the terminal voltage of the energy reservoir 8400. The determination component 8200 compares the measured voltage with the voltage interval table; and determines the proper power drawing amount to nearly balance the in-charging energy. A delivery component 8300 again delivers the coded message of the above determined proper power drawing level to the surplus DC/AC converter(s); such that the converter(s) can continuously operate at the directed power level to nearly balance incoming and outgoing charge of the energy reservoir 8400.

In one embodiment, the detection component 8100 of the MEUPT controller 8000 measures the terminal voltage of the surplus energy reservoir 8400 in real time. Even so, the determination component 8200 may still perform the comparison (of the measured voltage against the voltage interface table) every designated time interval compare. This comparison may result in one of the following three situations:

(1) If comparison of the measured voltage and voltage interval table indicates that the power level is too low, the controller 8000 can request (through the delivery component 8300) that the 3-phase DC/AC converter 8500 increase by one level of power extraction and conversion for the next designated time interval;

(2) If comparison of the measured voltage and voltage interval table indicates that the power level is too high, the controller 8000 can request (through the delivery component 8300) that the 3-phase DC/AC converter 8500 decrease by one level of power extraction and conversion for the next designated time interval;

(3) If comparison of the measured voltage and voltage interval table indicates that the power level is just-right, the controller 8000 can request the 3-phase DC/AC converter 8500 to stay at the same power extraction level for the next designated time interval, at least until the next occurrence of the comparison.

When power extraction/conversion adjustment levels of the DC/AC converter is small enough, the above design can work for all kinds of energy reservoir capacity; for all kind of DC/AC converter's up/down ramping speed; for all kind of solar strings' I-V characteristics; and for all climates of the PV site. Therefore, it is important that the controller can direct small adjustment steps for the 3-phase DC/AC converter which drawing power from the energy reservoir.

Typical conventional centralized 3-phase DC/AC converters can operate at very small adjustment steps when directed. However, the equipped communication channel, referred as the "dry connection box" in the art (and so referred herein) has typically only 6-bit communication channels via optical messages. For commanding more than 6 power extraction levels through the dry connection box, an encoding-decoding technique is employed. This technique allows passing up to $2^6=64$ messages to command the power extraction levels. With up to 64 adjustment power extraction levels, the required near zero net balancing in incoming energy and outgoing energy of the reservoir can be achieved technically.

Section Fourteen: PV Power Station Incorporating MEUPT Optimizer

Figure 9:
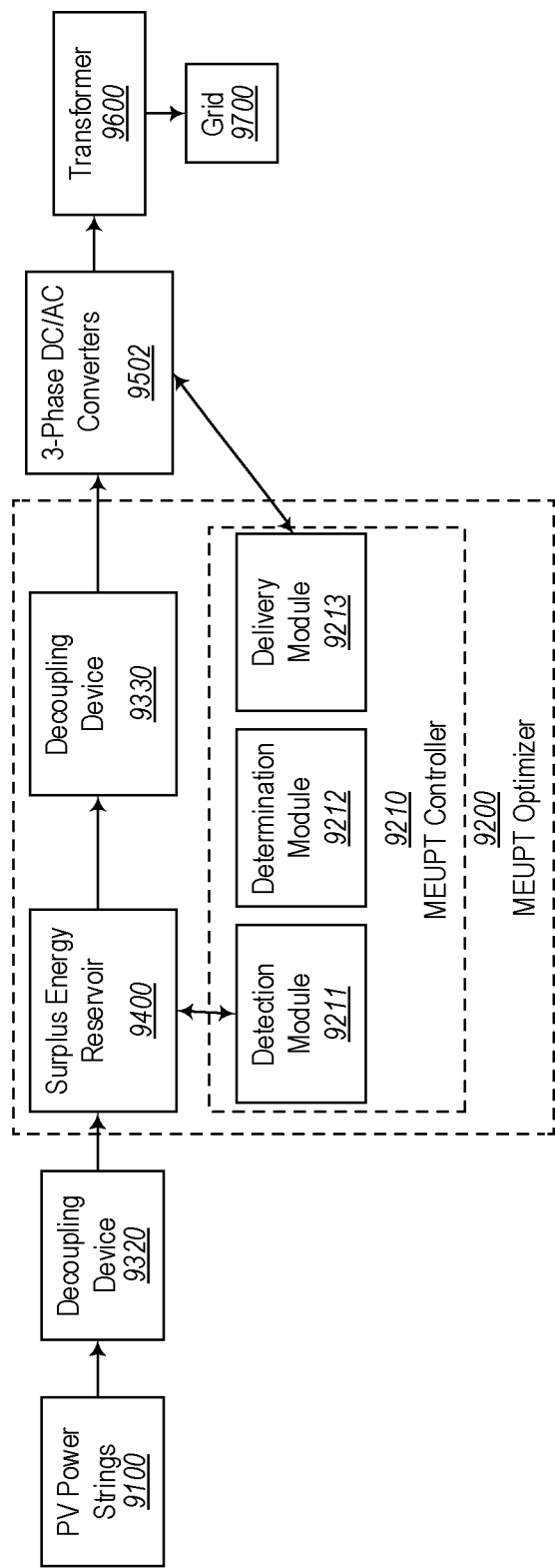
FIG. 9, illustrates a block diagram of the MEUPT controller of FIG. 8 in the context of a power station.

As depicted in FIG. 9, a PV power station 9000 incorporating an MEUPT optimizer 9200 that consisting an MEUPT controller 9210. The MEUPT controller 9200 comprises 3 executable components; namely, a detection component 9211 to measure the terminal voltage of the surplus energy reservoir 9400; a determination component 9212 to compare the measured voltage with the voltage interval table of the PV station; and a delivery component 9213 to notify the 3-phase DC/AC converter 4502 to boot-up, to drop-down, or to stay the same via the delivery component 4213. The components 9211, 9212 and 9213 of FIG. 9 are examples of the components 8100, 8200 and 8300, respectively of FIG. 8. The energy reservoir 9400 of FIG. 9 is an example of the energy reservoir 8400 of FIG. 8. The converters 9502 are examples of the converters 8500 of FIG. 8.

The PV power station 9000 also comprises of PV solar-strings 9100. The solar strings 9100 convert solar energy to electricity; and deliver the generated DC power to the surplus energy reservoir 9400 through decoupling device 9320. The 3-phase DC/AC converter 9502 receives DC power input from the surplus energy reservoir 9400 through the decoupling device 9330. The solar strings 9100 of FIG. 9 are collectively a DC energy source for charging the energy reservoir, and are examples of the solar strings 2111A and 2111B of FIG. 2B, the solar string 3110 of FIG. 3, the solar string 4110 of FIG. 4, the solar string 5110 of FIG. 5, the solar string 6110 of FIG. 6, and the solar string 7110 of FIG. 7. The decoupling device 9320 of FIG. 9 is an example of the decoupling device 2312B of FIG. 2B, decoupling device 3312 of FIG. 3, decoupling device 4312 of FIG. 4, decoupling device 5311 of FIG. 5, decoupling device 6311 of FIG. 6, and decoupling device 7202 of FIG. 7. The decoupling device 9330 of FIG. 9 is an example of the decoupling device 2313B of FIG. 2B, decoupling device 3313 of FIG. 3, decoupling device 4313 of FIG. 4, decoupling device 5313 of FIG. 5, decoupling device 6313 of FIG. 6, and decoupling device 7203 of FIG. 7.

As stated above, the MEUPT controller 9210 directs the 3-phase DC/AC converter 9502 to draw appropriate amount of energy from the energy reservoir 9400 to balance the input energy charging from the solar-strings 9100; which resulted in a near zero energy in-charging or out-drawing into the reservoir 9400. Thus, a small energy reservoir 9400 is adequate for the PV station. The converted AC power from the DC/AC converter is provided to the connecting power grid 9700 through the transformer 9600.

As used herein, the term "executable component" is used with respect to FIGS. 8 and 9. The term "executable component" is the name for a structure that is well understood to one of ordinary skill in the art in the field of computing as being a structure that can be software, hardware, firmware or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in firmware or hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination.

The present invention may be embodied in other specific forms without departing from its spirit or essential characteristics. The described embodiments are to be considered in all respects only as illustrative and not restrictive. The scope of the invention is, therefore, indicated by appended claims rather than by the forgoing description. All changes which come within the meaning and range of equivalency of the claims are to be embraced within their scope.

What is claimed is:

1. An energy storage system configured to provide power to a power grid, the energy storage system comprising:
   an energy reservoir configured to receive DC energy at an input of the energy reservoir from a DC energy source and deliver the received DC energy to another device at an input of the other device, the energy reservoir being structured to have an energy storage capacity of less than 2 Faradays per megawatt of the DC energy source;
   a system controller configured to regulate an amount of the DC energy delivered to the other device so that the delivered DC energy is nearly balanced with the amount of DC energy received by the energy reservoir, so that the energy storage capacity of the energy reservoir is not exceeded,
   wherein the system controller is configured to turn on and off the input of the energy reservoir and the input of the other device alternately at a same frequency as the AC frequency of the power grid, such that when the input of the energy reservoir is on, the input of the other device is off, and when the input of the energy reservoir is off, the input of the other device is on.

2. The energy storage system of claim 1, the DC energy source being a power station, the DC energy reservoir comprising capacitors.

3. The energy storage system of claim 2, the DC energy reservoir comprising only capacitors.

4. The energy storage system of claim 2, the DC energy reservoir comprising only thin film capacitors.

5. The energy storage system of claim 2, the capacitor having a capacity between 0.1 and 1.0 Faradays per megawatt of the DC energy source, a remaining capacity of the DC energy reservoir being provided by one or more batteries.

6. The energy storage system of claim 1, the DC energy source being a power station, the DC energy reservoir comprising thin film capacitors.

7. The energy storage system of claim 1, the DC energy source being a power station, the DC energy reservoir comprising a combination of capacitors and batteries.

8. The energy storage system of claim 1, the system controller comprising:
   a detection component configured to measure a stored energy level in the energy reservoir;
   a determination component configured to use the measured stored energy level of the energy reservoir to evaluate whether an adjustment is to be made; and
   a delivery component configured to encode an instruction to perform the adjustment into a coded message when the determination component determines that the adjustment is to be made, and also configured to deliver the coded message to the another device from which DC energy is discharged such that the discharging power is properly adjusted.

9. The energy storage system of claim 8, the detection component measuring the stored energy level by measuring a terminal voltage of the energy reservoir.

10. The energy storage system of claim 9, the measuring of the terminal voltage of the energy reservoir occurring in real time.

11. The energy storage system of claim 10, the determination component being configured to perform the evaluation of whether an adjustment is to be made on a periodic basis with a designated time interval.

12. The energy storage system of claim 8, the determination component being configured to perform the evaluation of whether an adjustment is to be made on a periodic basis with a designated time interval.

13. The energy storage system of claim 8, the DC energy being discharged to at least one DC/AC converter.

14. The energy storage system of claim 13, the delivery component configured to deliver the coded message to the DC/AC converter through a converter equipped dry connection box.

15. The energy storage system of claim 13, the delivery component configured to deliver a respective coded message to each of a plurality of DC/AC converters including the DC/AC converter.

16. The energy storage system of claim 15, the delivery component configured to deliver the respective coded message to at least one of the plurality of DC/AC converters via an equipped dry connection box.

17. The energy storage system in accordance with claim 13, wherein the energy reservoir is capable of holding an amount of DC energy that is received from the DC energy source over a period of three AC cycles or less of the power grid.

18. The energy storage system in accordance with claim 1, wherein the system controller comprises:
a first switch controlling the input of the energy reservoir;
a second switch controlling the input of the other device;
a duty factor adjuster (DFA) configured to control the first switch to be on and off at the frequency of the power grid; and
an out-of-phase locking module configured to reverse the phase of the DFA and to control the second switch to be off and on at the frequency of the power grid;
wherein the DFA and the out-of-phase locking module cause the first switch and the second switch to be turned on and off alternately, such that when the first switch is on, the second switch is off, and when the first switch is off, the second switch is on.

19. The energy storage system in accordance with claim 18, wherein the other device is a DC/AC converter.

* * * * *